United States Patent
Kim et al.

(10) Patent No.: US 11,663,801 B2
(45) Date of Patent: May 30, 2023

(54) METHOD FOR DETERMINING SEARCH REGION USING REGION INFORMATION AND OBJECT INFORMATION AND SYSTEM PERFORMING THE SAME

(71) Applicant: KOREA INSTITUTE OF SCIENCE AND TECHNOLOGY, Seoul (KR)

(72) Inventors: Ig Jae Kim, Seoul (KR); Heeseung Choi, Seoul (KR); Haksub Kim, Seoul (KR); Seungho Chae, Seoul (KR); Yoonsik Yang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 422 days.

(21) Appl. No.: 17/100,943

(22) Filed: Nov. 23, 2020

(65) Prior Publication Data

US 2021/0406301 A1  Dec. 30, 2021

(30) Foreign Application Priority Data

Jun. 24, 2020  (KR) .......................... 10-2020-0076967

(51) Int. Cl.
| | |
|---|---|
| *G06V 10/22* | (2022.01) |
| *G06F 16/535* | (2019.01) |
| *G06F 16/538* | (2019.01) |
| *G06F 18/213* | (2023.01) |
| *G06V 30/19* | (2022.01) |
| *G06V 10/424* | (2022.01) |

(52) U.S. Cl.
CPC ............ *G06V 10/22* (2022.01); *G06F 16/535* (2019.01); *G06F 16/538* (2019.01); *G06F 18/213* (2023.01); *G06V 10/424* (2022.01); *G06V 30/19* (2022.01)

(58) Field of Classification Search
None
See application file for complete search history.

(56) References Cited

U.S. PATENT DOCUMENTS

2020/0320769 A1* 10/2020 Chen ................. G06F 18/214
2021/0225013 A1*  7/2021 Kim .................... G06V 40/10

FOREIGN PATENT DOCUMENTS

| CN | 111047621 A | * | 4/2020 | ......... G06K 9/00362 |
|---|---|---|---|---|
| KR | 101142933 B1 | | 5/2012 | |
| KR | 10-1464192 B1 | | 11/2014 | |

(Continued)

OTHER PUBLICATIONS

Guangcong Wang et al., "Spatial-Temporal Person Re-Identification," Proceedings of the Association for the Advancement of Artificial Intelligence (AAAI) Conference on Artificial Intelligence, 2019, pp. 8933-8940.

*Primary Examiner* — Bernard Krasnic
(74) *Attorney, Agent, or Firm* — Cantor Colburn LLP

(57) ABSTRACT

Embodiments relate to a method for determining a search region including acquiring object information of a target object included in an image query, generating a set of non-image features of the target object based on the object information, setting a search candidate region based on a user input, acquiring information associated with the search candidate region from a region database, and determining a search region based on at least one of the information associated with the search candidate region or at least part of the set of non-image features, and a system for performing the same.

7 Claims, 7 Drawing Sheets

(56) References Cited

FOREIGN PATENT DOCUMENTS

| | | | |
|---|---|---|---|
| KR | 101498985 | B1 | 3/2015 |
| KR | 10-1856488 | B1 | 5/2018 |
| KR | 101863727 | B1 | 6/2018 |
| KR | 102039277 | B1 | 10/2019 |
| KR | 102063135 | B1 | 1/2020 |
| KR | 102147100 | B1 | 8/2020 |

* cited by examiner

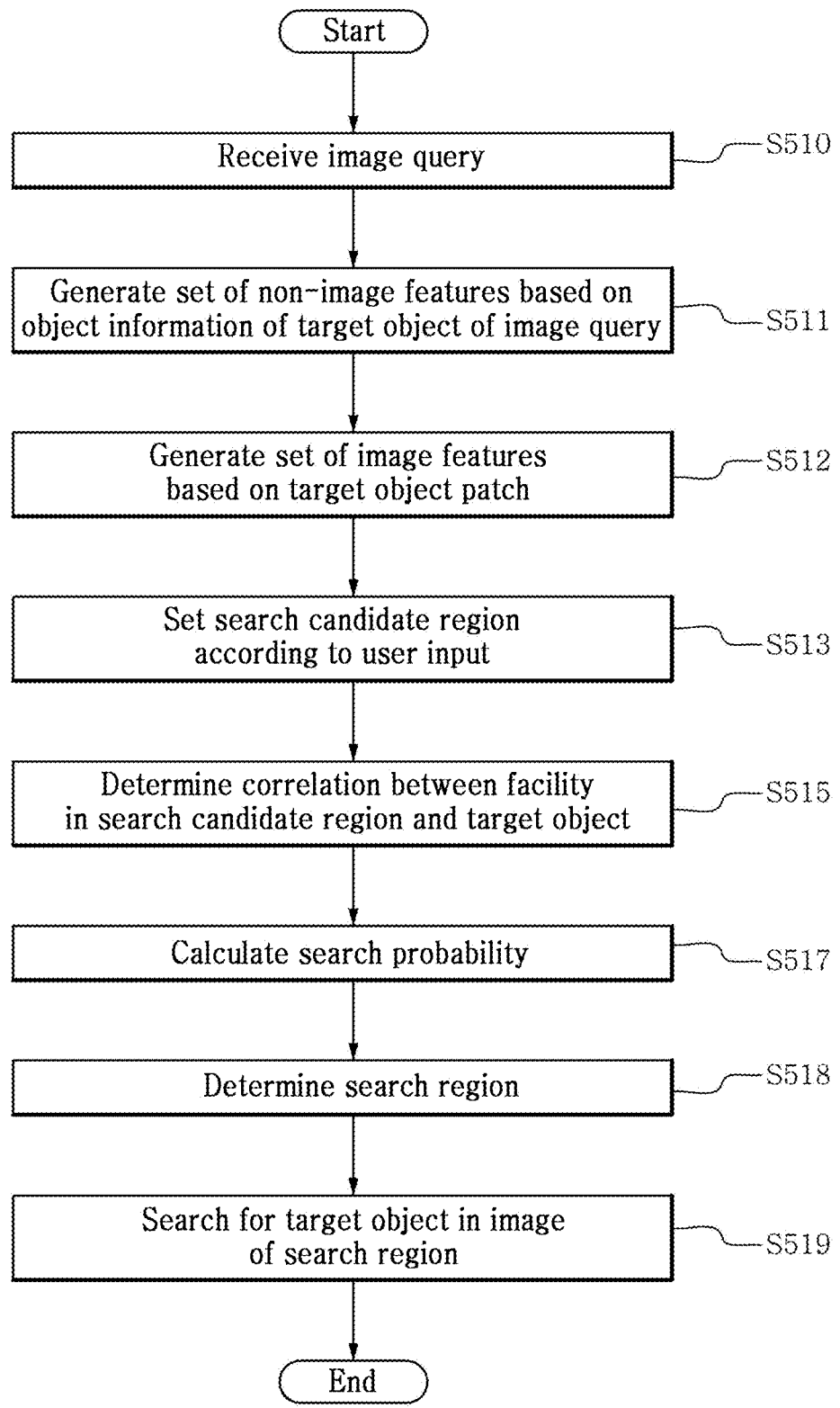

METHOD FOR DETERMINING SEARCH REGION USING REGION INFORMATION AND OBJECT INFORMATION AND SYSTEM PERFORMING THE SAME

CROSS-REFERENCE TO RELATED APPLICATION

This application claims priority to Korean Patent Application No. 10-2020-0076967, filed on Jun. 24, 2020, and all the benefits accruing therefrom under 35 U.S.C. § 119, the contents of which in its entirety are herein incorporated by reference.

TECHNICAL FIELD

Embodiments of the present disclosure relate to technology that determines a search region to support the search of a video of a target object in a huge quantity of closed-circuit television (CCTV) videos, and more particularly, to a method for determining a search region to perform an initial search using object information of a target object and region information of a search candidate region and a system for performing the same.

DESCRIPTION OF GOVERNMENT-FUNDED RESEARCH AND DEVELOPMENT

This study (Project No. 2018M3E3A1057288, Project Name: Fusion recognition technology development (R&D) for identifying missing children) was supported by National Research Foundation of Korea under the superintendence of Ministry of Science and ICT.

BACKGROUND ART

Recently, with the growing public interest in security/safety, the number of closed-circuit television (CCTV) cameras installed in the roads, streets and buildings is increasing sharply. The system connected to the CCTV cameras acquires video frames of more than a few thousand to a few tens of thousands per second.

When a crime or a missing person incident occurs, it is the most important to identify the movements of a specific desired target object (for example, a face, a human, a vehicle, etc.) in a short time. However, it takes a long time to find the specific target object in a large number of input frames.

Accordingly, it is necessary to target the range of input frames by setting the initial search region.

Korean Patent No. 10-1142933 (2012 May 11.) finds a user's location through the user's mobile terminal, thereby reducing the search range of CCTV videos and the search time. However, it is difficult to perform a rapid search when a search target object does not have a mobile terminal or the mobile terminal of the search target object is not detected.

DISCLOSURE

Technical Problem

According to an aspect of the present disclosure, there may be provided a search system including multiple closed-circuit televisions (CCTVs), for determining a search region to perform an initial search using object information of a target object and region information of a search candidate region.

In addition, there may be provided a method for determining a search region using object information and region information and a computer-readable recording medium having the method recorded thereon.

Technical Solution

A method for determining a search region according to an aspect of the present disclosure is performed by a computing device including a processor, and the method may include acquiring object information of a target object included in an image query, generating a set of non-image features of the target object based on the object information, setting a search candidate region based on a user input, acquiring information associated with the search candidate region from a region database, and determining a search region based on at least one of the information associated with the search candidate region or at least part of the set of non-image features.

In an embodiment, the method for determining may further include acquiring a target object patch representing at least part of the target patch, included in the image query, and generating a set of image features of the target object based on the target object patch. Here, the search region is determined further based on the set of image features of the target object (i.e., based on at least one of the information associated with the search candidate region or at least part of the set of non-image features, and the set of image features).

In an embodiment, setting the search candidate region may include, when the user input forms a shape having an area, setting a region corresponding to the formed shape as the search candidate region, when the user input forms a line, setting a region including the formed line as a path as the search candidate region, when the user input forms a point, setting at least one search candidate region based on the point, and when the user input forms a plurality of points, generating at least one path based on the plurality of points, and setting a region including the generated path as the setting candidate region.

In an embodiment, the region information includes geographic information of the corresponding preset region, information associated with a place located in the region, and situation information representing a normal situation of all or part of the corresponding region. Here, the situation information includes a time, frequency or location of an event occurred before the image query is inputted, and an amount or direction of movement of an object in the corresponding region.

In an embodiment, the method may further include determining a correlation between the search candidate region and the target object based on a correlation rule defining association between a specific region and a specific object.

In an embodiment, the object information may include a plurality of feature items and data of the corresponding items. Here, the plurality of feature items may include at least one event information related to the target object among an object class, a color item, an object size item, texture information and appearance information.

In an embodiment, the set of image features may be generated by applying the target object patch to a machine learning model configured to detect a body part in a human image seen in a target patch or a patch of an object of interest and calculate skeleton information and body-part information; extract global features from reconstruction information of the skeleton and the body-part in combination; and extract features per part from each of the skeleton information and the body-part information, and output the feature result information of a tube by concatenation of the global features and the features per part.

In an embodiment, determining the search region may include calculating a matching score based on a set of features of an image of the search candidate region and a set of features of the target object, and calculating a search probability in each search candidate region through a combination of an activation function and the matching score.

In an embodiment, the matching score is calculated through the following Equation:

$$s(x_t, x_j) = \frac{x_t \cdot x_j}{\|x_t\|\|x_j\|} \quad \text{[Equation]}$$

where $x_t$ denotes the set of features of the target object, and $x_j$ denotes the set of features of the $j^{th}$ image captured in the corresponding search candidate region, and the set of features of the target object may include the set of image features of the target object as a subset.

In an embodiment, the matching score is calculated through the following Equation:

$$s(x_t, x_j) = \frac{x_t \cdot x_j}{\|x_t\|\|x_j\|} * (x_{info}, x_{region}) \quad \text{[Equation]}$$

where $x_t$ denotes the set of features of the target object, $x_j$ denotes the set of features of the $j^{th}$ image captured in the corresponding search candidate region, $x_{info}$ denotes the set of non-image features included in the object information, and $x_{region}$ denotes the region information of the search candidate region, and the set of features of the target object may include the set of non-image features of the target object and the set of image features of the target object as a subset.

In an embodiment, the $x_{info}$ and $x_{region}$ may be set to specific initial values, and preset predetermined values may be summed for an object and a region having a correlation defined between.

In an embodiment, the combination of the activation function and the matching score may be represented by the following Equation, $$f(x; \lambda, \gamma) = \frac{1}{1 + \lambda e^{-\gamma x}} \quad \text{[Equation]}$$

where x denotes the matching score, and λ and γ are constants, λ denotes a smoothing factor and γ denotes a shrinking factor.

A computer-readable recording medium according to another aspect of the present disclosure may store program instructions that can be read and executed by a computing device. Here, when the program instructions are executed by a processor of the computing device, the processor performs the method for determining a search region according to the above-described embodiments.

A system according to still another aspect of the present disclosure may include a plurality of closed-circuit televisions (CCTVs) and a server. Here, the server may include a feature acquisition unit to acquire object information of a target object included in an image query, and generate a set of non-image features of the target object based on the object information, a search candidate setting unit to set a search candidate region based on a user input, a search region determination unit to acquire information associated with the search candidate region from a region database, and determine a search region based on at least one of the information associated with the search candidate region or at least part of the set of non-image features, and a search unit to search for a video of the target object in a source video captured by the CCTV in the determined search region.

Advantageous Effects

The search system according to an aspect of the present disclosure performs an initial search in a search region determined to have a high probability of having captured a target object to search for a video frame (or a video) of the target object in a huge quantity of videos acquired from multiple closed-circuit televisions (CCTVs). Accordingly, the search system reduces the search time. Further, it is possible to prevent poor performance caused by the increased search time.

Particularly, when the target object, for example, a vehicle or a human, is not identified and thus its terminal cannot be tracked, it is possible to quickly search out the target object in a large number of input frames.

The effects of the present disclosure are not limited to the above-mentioned effects, and other effects not mentioned herein will be clearly understood by those skilled in the art from the appended claims.

DESCRIPTION OF DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and not intended to be limiting of the present disclosure. Additionally, for clarity of description, the accompanying drawings may show some elements to which a variety of modifications such as exaggeration and omission are made.

FIG. 5 is a flowchart of a method for determining a search region according to an embodiment of the present disclosure.

BEST MODE

The terminology used herein is for the purpose of describing particular embodiments and not intended to be limiting of the present disclosure. Unless the context clearly indicates otherwise, the singular forms as used herein include the plural forms as well. The term "comprises" or "includes" when used in this specification, specifies the presence of stated features, regions, integers, steps, operations, elements, and/or components, but does not preclude the presence or addition of one or more other features, regions, integers, steps, operations, elements and/or components.

Unless otherwise defined, all terms (including technical and scientific terms) used herein have the same meaning as commonly understood by those skilled in the art. It is further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

In the specification, an event includes an incident and an accident.

Hereinafter, the embodiments of the present disclosure will be described in detail with reference to the drawings.

Figure 1:
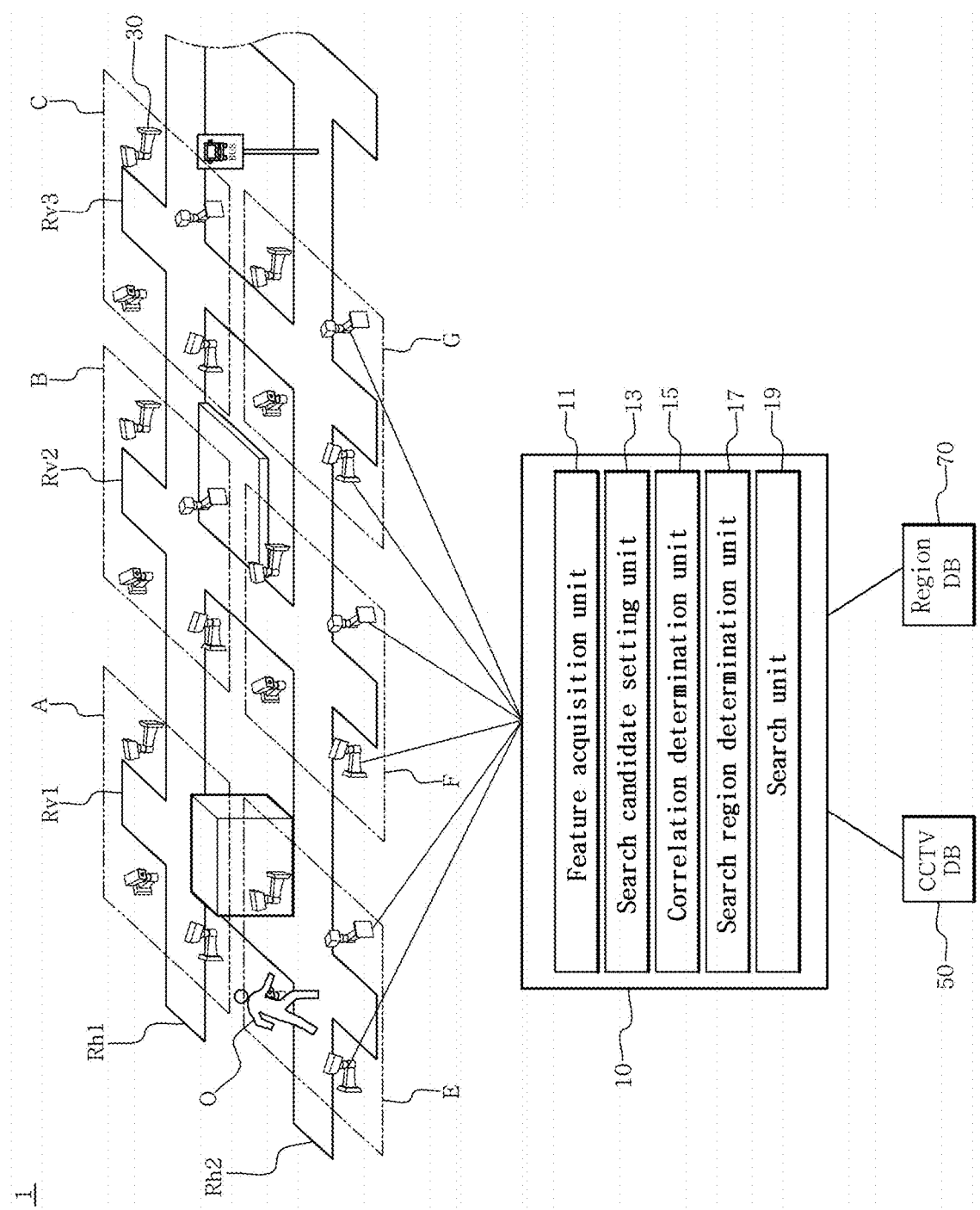
FIG. 1 is a conceptual diagram of a search system according to an embodiment of the present disclosure.

FIG. 1 is a conceptual diagram of a search system according to an embodiment of the present disclosure.

Referring to FIG. 1, the search system 1 includes a server 10 and a plurality of closed-circuit televisions (CCTVs) 30 to provide an image and/or a video to the server 10. The search system 1 may receive a user's image query, and search for an image (for example, a video frame) or a video of a target object of the image query. Additionally, the search system 1 may provide the search results to the user. The operation of FIG. 1 will be described in further detail with reference to FIG. 2 below.

In an embodiment, the search system 1 includes a feature acquisition unit 11; a search candidate setting unit 13; a correlation determination unit 15, a search region determination unit 17; and a search unit 19. In some embodiments, the search system 1 includes a single feature acquisition unit 11, the single feature acquisition unit 11 may be configured to generate a set of features of a target object and a set of features of an image (for example, a set of features of a captured object included in the image). In some other embodiments, the search system 1 may include a first feature acquisition unit 11 to generate the set of features of the target object, and a second feature acquisition unit 11 to generate the set of features of the image.

The search system 1 according to embodiments may have aspects of entirely hardware, entirely software, or partly hardware and partly software. For example, the system may refer collectively to hardware capable of processing data and software that manages the hardware. The term "unit", "module", "device" or "system" as used herein is intended to refer to a combination of hardware and software that runs by the corresponding hardware. For example, the hardware may be a computing device capable of data processing, including a Central Processing Unit (CPU), a Graphic Processing Unit (GPU) or other processor. Additionally, the software may refer to a process being executed, an object, an executable, a thread of execution and a program.

The CCTV 30 is an imaging device configured to receive a physical signal and capture a situation within the coverage to generate a video (or an image). The video generated by the CCTV 30 is referred to as a source video. The system 1 acquires the source video including an object and/or a background within the coverage in real time during the operation of the CCTV 30.

The plurality of CCTVs 30 is installed in a plurality of regions. The plurality of regions includes regions in which the plurality of CCTVs 30 is installed with their own independent view range for each CCTV 30, or at least one partial region in which the plurality of CCTVs 30 is installed sharing at least part of their view ranges so that the same object is captured by at least some of the plurality of CCTVs 30 in overlapping views.

The CCTV 30 connected to the server 10 via wired/wireless communication has at least part of a region in which the CCTV 30 is installed as the view range. Each CCTV 30 captures a situation within the corresponding view range to generate a source video, and transmits the source video and related detailed information to the server 10.

In an embodiment, the plurality of regions includes regions in which the plurality of CCTVs 30 is independently installed, or regions in which some of the plurality of CCTVs 30 are installed sharing at least part of their view ranges. Some CCTVs 30 installed in the regions are two or more of the CCTVs 30. Then, for example, when an object moving in the corresponding region passes through the view range shared by the plurality of CCTVs 30, a plurality of source videos of the object is acquired. That is, the object is captured by the plurality of CCTVs 30 in overlapping views.

For example, in FIG. 1, four CCTVs 30 may be installed at a four-way intersection E next to a senior center. Some or all of the four CCTVs 30 may be installed with the view range for capturing the object O in overlapping views.

The plurality of CCTVs 30 is connected to the server 10 via a wired/wireless network to generate a plurality of source videos and provide the source videos to the server 10. The CCTV 30 is not limited to an analog CCTV, a digital CCTV, a fixed CCTV and a moveable CCTV, and may include various types of imaging devices capable of acquiring image information in real time. For example, a smartphone, a black box, etc. may act as the CCTV 30 of the present disclosure.

Additionally, the CCTV 30 is further configured to generate an image or a video, and generate detailed information associated with the generated image or video (for example, the source video). The detailed information includes identification information (for example, an identifier) of the CCTV 30 having captured the source video, location information of the CCTV 30, the shooting time of the source video and/or identification information of the source video. For example, when the CCTV 30 captures a situation within the coverage to generate a source video, a plurality of frames of the source video and detailed information including an identifier of the corresponding CCTV 30, a frame identifier and the shooting time are acquired. When the related source video is transmitted, the detailed information is transmitted together, and unless the context clearly indicates otherwise, the present disclosure is not intended to exclude the transmission of the related detailed information from the operation of transmitting the source video to other component.

The server 10 is a plurality of computer systems or computer software implemented as a network server, and is configured to receive the image (for example, the source video) generated by the plurality of CCTVs 30 via the wired/wireless network. Here, the network server refers to a computer system and computer software (a network server program) connected to a low-level device capable of communicating with other network server via a computer network such as private Intranet or Internet to receive a task request, perform the task and provide the results. However, the network server should be understood in a broad concept including the network server program as well as a series of application programs running on the network server, and in some cases, various types of databases built inside.

The search system 1 may include at least one database.

In an embodiment, the search system 1 may include a CCTV database 50 to store the source image (or video)

acquired from the CCTV 30 and/or a region database 70 to store information associated with the region in which the CCTV is installed. The region database 70 will be described in further detail with reference to the following tables and FIG. 4.

Before receiving a request for image information (hereinafter, an image query) associated with the target object, the search system 1 may store the source image (or video) in the CCTV database 50, or additionally store image processing information based on the source image (or video).

In an embodiment, the search system 1 may extract the set of features of the image (for example, by the feature acquisition unit 11) and store the same as image processing information in the CCTV database 50. Then, when the search system 1 receives the image query, the search system 1 may determine a search region using the pre-stored set of features of the image.

The feature acquisition unit 11 may generate a feature dataset of an object included in a user input or an object included in an input image. When the server 10 receives the image query for the target object, the feature acquisition unit 11 generates the set of features of the target object based on the image query. The set of features of the target object may include a subset of non-image features acquired from object information and/or a subset of image features acquired from a target object patch.

In an embodiment, the image query may include the object information of the target object and/or the target object patch of at least part of the target object.

The feature acquisition unit 11 may receive the object information of the target object included in the image query. The object information includes information that represents the target object to be searched. In an embodiment, the object information includes a plurality of non-image feature items and data of each item. The object information includes an information item of the corresponding item and data of each item.

The plurality of non-image feature items includes an object class. In specific embodiments, the plurality of non-image feature items may further include a detailed item. The detailed item is a variety of items that describe the target object, other than the object class. The detailed item may include, for example, at least one of a color item, an object size item, a texture item, a shape feature item or an event item.

The object class indicates an object type related to an event, for example, an incident and an accident. The object type includes, for example, a human and/or a vehicle.

Additionally, the object class may further include a subclass of object that is the criterion for sub-classification of the object type. For example, the object class may include a child, a senior, a person with dementia and/or mental retardation as a subclass of the human. The object class may include a car, a van, a sports utility vehicle (SUV) and a truck as a subclass of the vehicle.

The subclass is related to a unique movement pattern of the target object. When the target object is a person with dementia, there is a high possibility that the target object will move along the movement pattern unique to the person with dementia. When the target object is a mentally retarded person, there is a high possibility that the target object will move along the movement pattern unique to the mentally retarded person. The movement pattern for each object class will be described in further detail in the following correlation.

The detailed information may include data of color related to facial characteristics and clothing of the target object as the data associated with the color item. The data of the color item may include, for example, data of color of shirt and/or pants of the target object.

The detailed information may include size data associated with the size of the target object as the data that is associated with the object size item. When the target object is a human, the object size information may include physical sizes (for example, height), and when the target object is an object (for example, a vehicle), the object size information may include specifications of the object.

The detailed information may include data associated with the texture of the target object as the data of the texture item. In the case of a human, skin texture of the human is closely related to age. Accordingly, when the target object is a human, the texture information may include an age value. Alternatively, when the target object is an object, the texture information may include information associated with surface roughness of the object.

The detailed information may include data associated with the outward appearance uniquely possessed by the target object, represented less often in other object, as the data of the appearance item. The appearance feature includes information used as physical or special features in a missing poster. The appearance feature information may include, for example, information about the presence or absence of a spot or the location of the spot, the shape of eyes and accessories if worn.

The detailed information may include data associated with an event related to the target object as the data of the event item. The event information may include an event type, an event occurrence time, and/or an event place. The event type includes an incident including a missing person and/or an accident including a crime and a car accident.

The server 10 may generate the subset of non-image features of the target object (for example, by the feature acquisition unit 11) using the information associated with the non-image features of the target object acquired through the image query. The subset includes feature values of at least some of the plurality of items of the object information. The set of features may be referred to as a feature vector. The components of the feature vector correspond to those of at least some of the plurality of items.

When the item data of the non-image features is a value, the feature acquisition unit 11 may use the value as the feature value of the set of features. Additionally, the feature acquisition unit 11 may convert the item data of the non-image features into a corresponding value based on a pre-stored rule and use the value as the feature value of the set of features.

The server 10 may pre-store a color table that converts color information into values. Then, the server 10 may generate the feature value of the color item by conversion of the color value corresponding to the color information through the color table.

For example, when the server 10 acquires the object information of the target object including {object class, height}, the server 10 may generate the feature vector including {a value corresponding to the object class, a height value} (S250).

In some embodiments, the feature acquisition unit 11 has, as the feature value, a binary value (for example, 0 or 1) of information represented by YES/NO such as an accessory item, a mental retardation item and a dementia item.

In some other embodiments, the feature acquisition unit 11 may acquire the features of information represented as a text by extracting an image level of features by applying a text query included in the image query to a machine learned text analysis model. The text analysis model is a model machine-learned to extract the features from the shape of the text and determine the meaning of the corresponding text. Then, the feature acquisition unit 11 may generate the set of features of the target object including the extracted features.

In specific embodiments, the text analysis model may include classifying the category of the text by extracting the attributes of the text; and embedding the attributes.

As such, when the server 10 receives the image query including color information, age information, gender information, accessory information, mental retardation information and/or dementia information, the server 10 may acquire the feature value of each feature item based on the data associated with at least one of the items of the object information. Then, the server 10 may generate the feature vector including the subset of feature values of the items of the object information.

The server 10 may generate the subset of image features of the target object using the target object patch acquired through the image query (for example, by the feature acquisition unit 11). The image features may be referred to visual features or image attributes.

When the server 10 receives the input of the target object patch (for example, by the feature acquisition unit 11), the server 10 extracts a set of visual features of the target object from the patch. Some or all of the set of visual features may be a subset of the set of features of the target object. The server 10 may use the set of extracted image features to determine the search region.

The server 10 may extract the set of visual features from the target object patch through various types of image attribute extraction algorithms. The image attribute extraction algorithm may include a neural network based algorithm.

In an embodiment, the set of visual features may be extracted from the target object patch through an attention model. The attention model is a model having a neural network structure configured to realize a human's visual attention phenomenon.

The attention model includes a feature extraction layer. The feature extraction layer includes at least one convolution layer. The attention model may be configured to calculate at least one feature map based on the extracted features.

The attention model is trained based on a pair of training images. The attention model extracts each feature from each image of the pair of training images, and calculates the attention map based on each feature. The attention model is learned to minimize an identification attention loss (Lia). The structure and learning process of the attention model is described in further detail in Re-Identification with Consistent Attentive Siamese Networks (2019.04.), and a detailed description is omitted herein.

In another embodiment, the set of visual features may be extracted from the target object patch through a skeleton/body feature extraction model.

Figure 2:
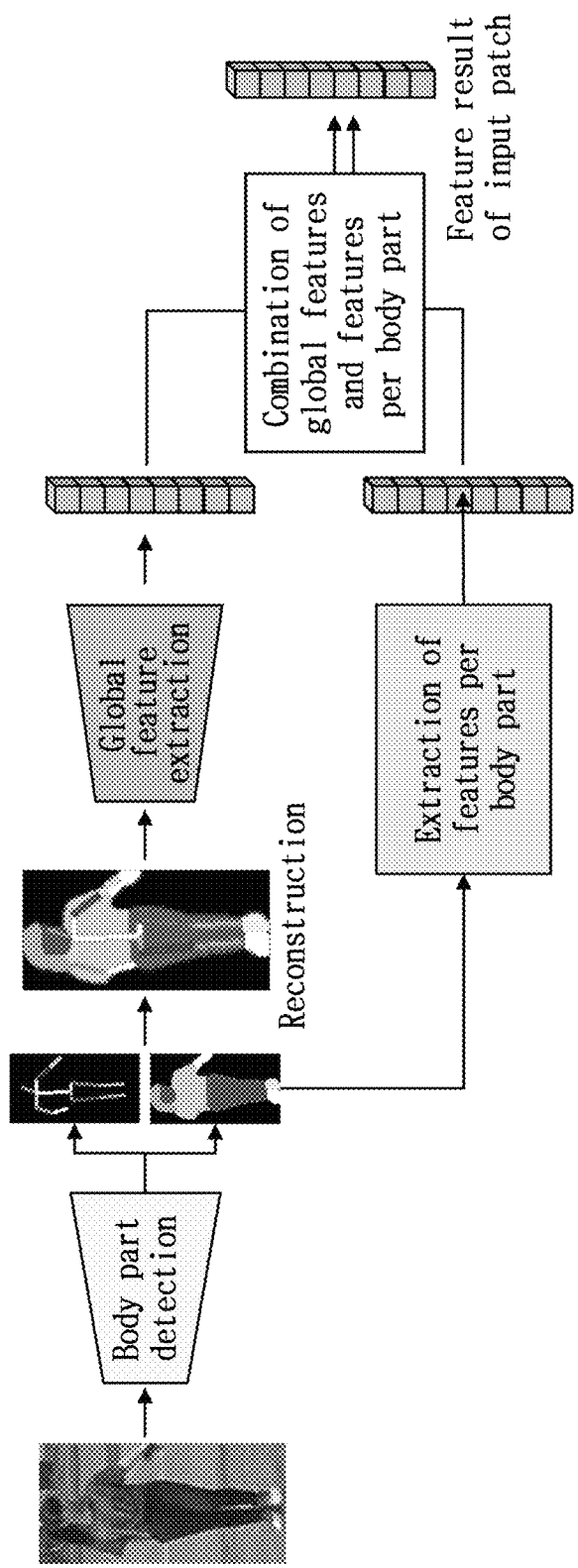
FIG. 2 is a network architecture diagram of a skeleton/body feature extraction model according to an embodiment of the present disclosure.

FIG. 2 is a network architecture diagram of the skeleton/body feature extraction model according to an embodiment of the present disclosure.

Referring to FIG. 2, the skeleton/body feature extraction model is configured to extract features of skeleton and/or body of the target object from the target object patch. When the target object is a human, the skeleton/body feature extraction model is configured to detect a body-part in an area in which the human is seen and calculate skeleton information and body-part information.

In an example, the skeleton/body feature extraction model may detect the body-part through Semantic segmentation and Instance segmentation algorithms. However, the skeleton/body feature extraction model is not limited to thereto, and may be performed by various types of segmentation algorithms.

Additionally, the skeleton/body feature extraction model is configured to extract global features from reconstruction information (for example, a mask reconstructed image) of skeleton and body-part in combination. Additionally, the skeleton/body feature extraction model is configured to extract features per part from each of the skeleton information and the body-part information.

Additionally, the skeleton/body feature extraction model may be configured to output feature concatenation information of the target object patch by concatenating the global features and the features per part.

The server 10 may extract the set of visual features including the global features, the features per part and/or the feature concatenation results.

The server 10 may generate the set of features of the target object having the set of non-image features acquired from the object information and/or the set of image features acquired from the target object patch (for example, by the feature acquisition unit 11) as a subset.

The search candidate setting unit 13 may set a search candidate region. The search candidate region is included in the entire region in which all the plurality of CCTVs 30 is installed.

In an embodiment, the search candidate region may be set based on the user input. The server 10 may receive the user input for setting the search candidate region.

Figure 3A:
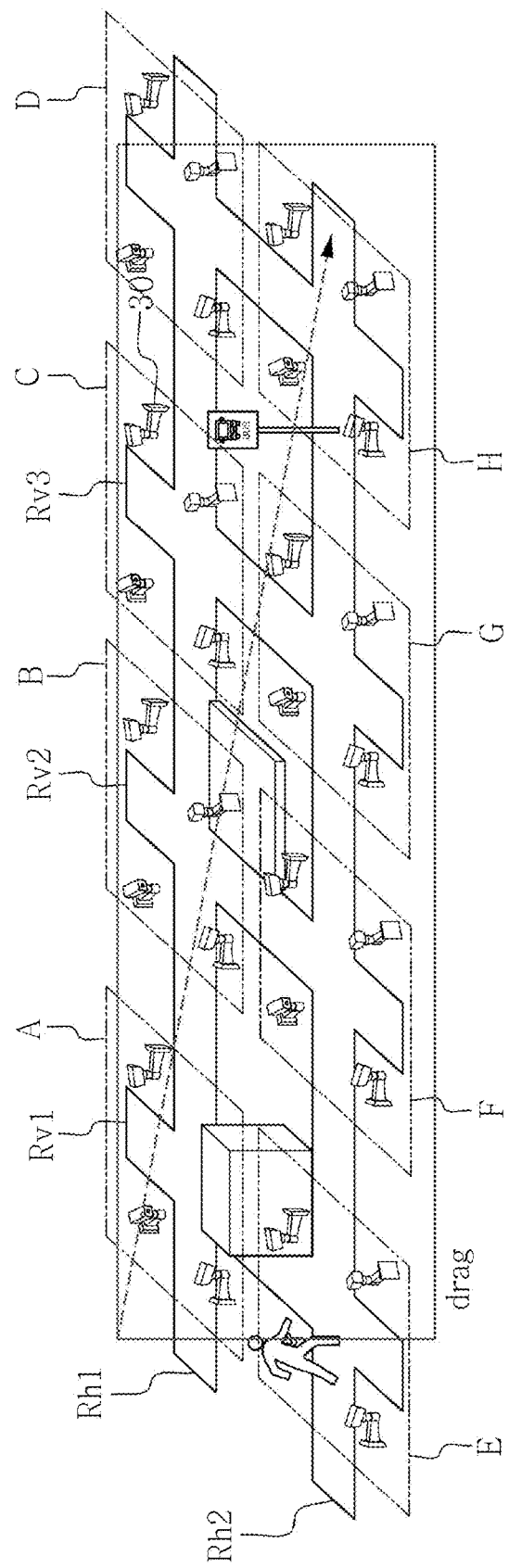
FIGS. 3A to 3C are diagrams for describing an operation of setting a search candidate region according to a user input, according to an embodiment of the present disclosure.
Figure 3B:
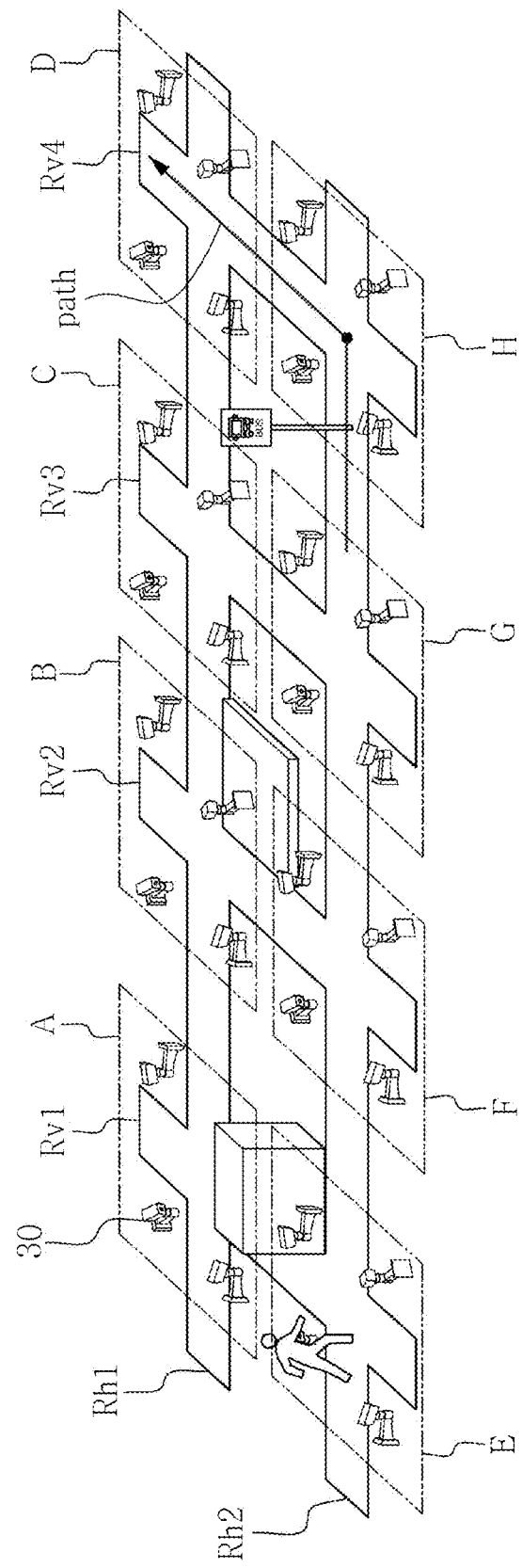
Figure 3C:
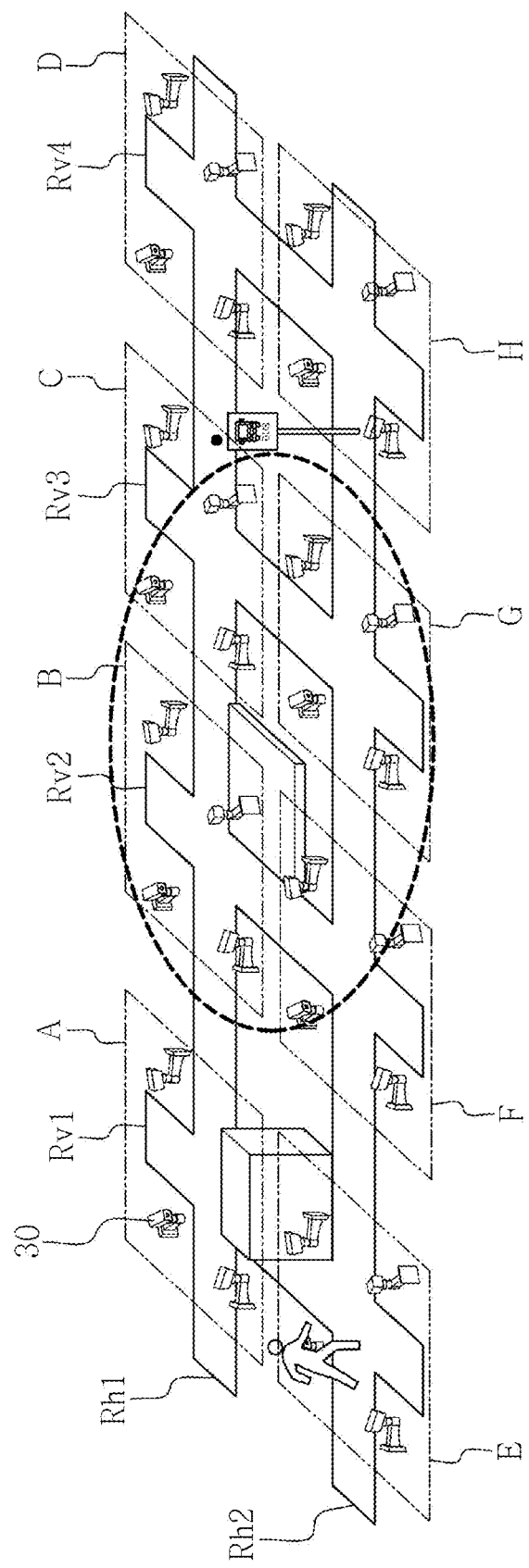

FIG. 3 is a diagram for describing the operation of setting the search candidate region according to the user input, according to an embodiment of the present disclosure.

Referring to FIG. 3, the user input includes an input for forming a partial area on the screen displaying all or part of the entire region, and an input for forming a line on the screen and/or an input for pointing out a point. In specific embodiments, the user input may be implemented as at least one input of a drag input, a pointing input or a combination thereof. The drag input and the pointing input may be inputted through a touch input or other input device (such as, for example, a mouse input, a keyboard input).

The input for forming the partial area may be implemented as a drag input.

In an embodiment, the search candidate setting unit 13 may form the partial area by a single drag input. When the server 10 receives the drag input, the server 10 is configured to form a shape having an inner length corresponding to the drag distance. The shape is the partial area of the screen, and may be, for example, a polygon, an ellipse or a circle. Then, the server 10 may set a region corresponding to the corresponding partial area as the search candidate region. For example, a region corresponding to the rectangular area shown in FIG. 3A may be set as the search candidate region.

Alternatively, the search candidate setting unit 13 may form the partial area by a plurality of drag inputs. When the server 10 receives the drag input, the server 10 is configured to form a line corresponding to the drag distance. The search candidate setting unit 13 may form a shape by connecting a plurality of lines according to the plurality of drag inputs. Then, the search candidate setting unit 13 may set a region corresponding to the corresponding partial area as the search candidate region.

The input for forming the line may be implemented as at least one input of a drag input, a point input or a combination thereof. The search candidate setting unit 13 may form a line having the start point to the end point according to the user input.

In an embodiment, when the server 10 receives the drag input, the server 10 is configured to form a line corresponding to the drag distance. The search candidate setting unit 13 may form a line having a pointing point at which the drag input starts as the start point and a release point at which the drag input ends as the end point, and determine a path corresponding to the corresponding line. Then, a region including the path corresponding to the corresponding line is set as the search candidate region. Here, the path corresponding to the corresponding line may include a road represented by the path line P shown in FIG. 3B.

Then, the server 10 may set the region including the path corresponding to the corresponding line as the search candidate region.

In an embodiment, when the server 10 receives at least two pointing inputs, the server 10 is configured to form a line having the first pointing input point as the start point and the last pointing input point as the end point. The search candidate setting unit 13 may form a single line by connecting each location in a sequential order based on the pointing order and the pointing location. The line may include a middle point. Then, the server 10 may set the region including the path corresponding to the corresponding line as the search candidate region. For example, as shown in FIG. 3B, the search candidate setting unit 13 may form a line running from a four-way intersection G to a four-way intersection D through a four-way intersection H, and set the region including the path, i.e., the road corresponding to the line as the search candidate region.

In another embodiment, when the server 10 receives at least two pointing inputs, the search candidate setting unit 13 may form at least one line by connecting each line. Any one of the one or more lines may pass through the other line. The search candidate setting unit 13 may determine the path corresponding to each line within the entire region. Then, the search candidate setting unit 13 may set the search candidate region including at least one line.

The input for forming the point may be implemented as a pointing input.

In an example, when the server 10 receives a single pointing input, the server 10 is configured to form a point at the pointing input location. The search candidate setting unit 13 may set a region corresponding to an area of a predetermined distance from the point as the search candidate region.

The search candidate setting unit 13 may pre-set the number of search candidate regions. The number may be 1 or n (n is a natural number of 2 or greater). For example, the server 10 may be set to set one, three or five search candidate regions.

In an embodiment, the server 10 may receive multiple user inputs to set a plurality of search candidate regions. Here, the multiple user inputs represent that any one of a drag input, a pointing input and a combination thereof is inputted in multiple numbers for each search candidate region to set a plurality of search candidate regions.

In another embodiment, the search candidate setting unit 13 may further set a plurality of other search candidate regions based on a single search candidate region formed by a single user input.

For example, the search candidate setting unit 13 may set one search candidate region by forming a circle having a first diameter as a predetermined distance, with a point of location of the pointing input as the center point. Subsequently, the server 10 may further set other search candidate region by additionally forming another circle having a second diameter and/or a third diameter by gradually extending the first diameter. Here, the second diameter has a value that is larger than the first diameter and smaller than the third diameter.

As such, the server 10 may set the area according to the user input as the search candidate region.

The correlation determination unit 15 acquires region information (neighborhoods information) of the search candidate region. In an embodiment, the correlation determination unit 15 may search for region information associated with at least one search candidate region in the region database 70.

The region information includes geographic information (for example, location) of the corresponding region and/or information associated with geographic/regional elements of the corresponding region. For example, the region information may include information about a place in the corresponding region and information about whether the place is a landmark or not.

The place refers to various types of facilities including constructions, infrastructures and other facilities in the corresponding region. The infrastructure includes identification information of the infrastructure (for example, the road name, location), or the type of the infrastructure (for example, a straight road, a crossroad, a roundabout). The construction includes a terminal and a building. The other facility includes a bus stop and a statue. The construction, infrastructure or facility corresponding to the landmark in the corresponding region may be further associated with landmark information.

When the region of FIG. 3A is set as the search candidate region, the server 10 may include information associated with a senior center, information associated with a playground, information associated with a bus stop, and information associated with roads $R_{V1}$, $R_{V2}$, $R_{V3}$, $R_{V4}$, $R_{H1}$, $R_{H2}$ as place information.

The place information includes geographic information of the place. The geographic information includes an absolute location and/or a relative location. The absolute location may be represented by, for example, longitude/latitude. The relative location indicates a relative location from the landmark in the corresponding region. The relative location includes the location of the landmark, the location of the corresponding place, the distance between the landmark and the corresponding place, and the gap between the landmark and the corresponding place.

For example, referring to FIGS. 1 and 3A, the absolute location of "four-way intersection B" may be represented on the basis of the landmark "playground". The relative location of "four-way intersection B" may include the distance ("near") from "playground".

Referring to FIGS. 1 and 3A, the relative location of "road $R_{H2}$" may be represented on the basis of the landmark, bus stop. The relative location of "road $R_{H2}$" may include the distance ("near") from the bus stop.

Additionally, the region information may include situation information depicting a normal situation of all or part of the corresponding region. The normal situation refers to a situation in which an event such as an incident and an accident does not occur.

In an embodiment, the situation information may include the amount and/or direction of movement of object(s) on the corresponding region. Information associated with the amount and direction of movement may be acquired from the image. In specific embodiments, before receiving the image query of the target object, the server 10 may detect a moving object in the image and detect the amount and/or direction of movement of the corresponding object. To this end, the feature acquisition unit 11 may acquire the amount and/or direction of movement of the object through the method for object tracking and detection in video.

Additionally, the situation information may further include statistical information associated with the event occurring in the corresponding region, including the type of the event and the frequency of the event. The server 10 may pre-store the information as the region information in the region database 70.

When the event occurrence time of the target object is inputted through the image query, the correlation determination unit 15 may acquire the situation information at the corresponding time.

Figure 4:
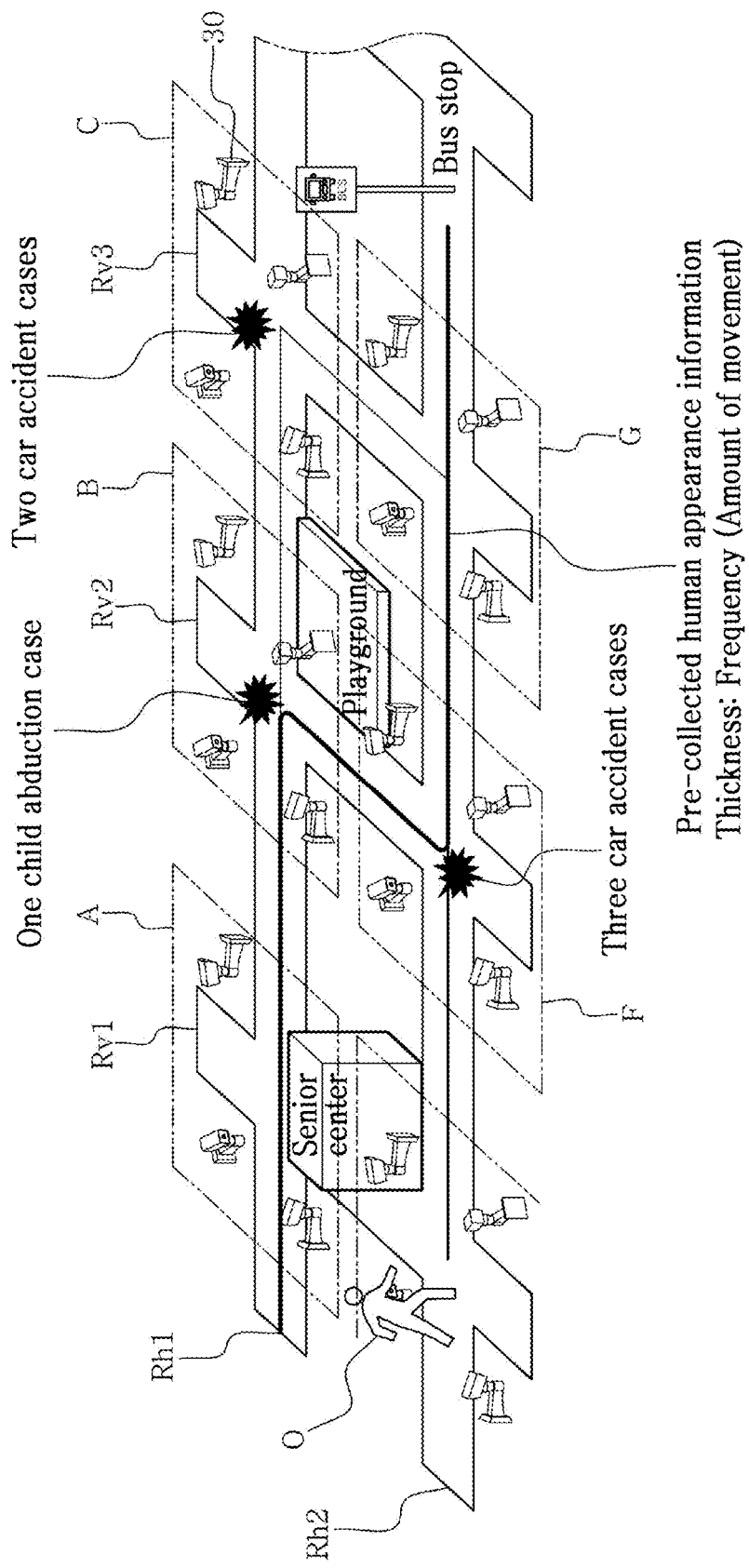
FIG. 4 is a diagram for describing region information (neighborhood information) of the search candidate region of FIG. 3A.

FIG. 4 is a diagram for describing the region information (neighborhood information) of the search candidate region of FIG. 3A.

When the server 10 sets the search candidate region of FIG. 3A according to the user input, the correlation determination unit 15 may search for the situation information including the information shown in FIG. 4 in the region database 70. The information of FIG. 4 includes the situation information including child abduction and a car accident as the event type. Additionally, the information of FIG. 4 may include the movement amount or direction information indicated by thickness in FIG. 4.

The correlation determination unit 15 determines a correlation based on the region information (for example, including at least one of the geographic information, place information or situation information of the region) and the object information of the target object.

The correlation is information defining association between the target object and the corresponding region. The correlation is determined based on the association between a specific object and a specific place. In some embodiments, the server 10 may pre-store a correlation rule including whether or not there is an association between the object class and the place.

When the specific object and the specific place are acquired, the correlation rule is a criterion for determining that they are associated with each other.

For example, when the specific object class is a child, the correlation rule is set such that the child is associated with a kindergarten, a school, a playground, a place in which an abduction incident occurred, and a place in which a car accident occurred. When the specific object class is a senior, the correlation rule is set such that the senior is associated with a senior center and a public transportation station. When the specific object class is a person with dementia, the correlation rule is set such that the person with dementia is associated with a public transportation station such as a bus stop.

In the first example, when the server 10 acquires object information including child as the object class and height and mental retardation information as other object information in the step S100, and the search candidate region of FIG. 3A is set, the server 10 may acquire region information and correlation information as below.

TABLE 1

| Object information of target object | | Region information of search candidate region | | |
|---|---|---|---|---|
| Object class | Other object information | Situation information | Place information | Correlation |
| Child | 110 cm (height) Mental retardation | Road (RH1) Car accident region Road (Rv1) Abduction incident region Road (R$_{H2}$) Car accident region | Playground near four-way intersection (B) Bus stop near road (R$_{H2}$) | Child-Playground Child-Abduction incident region Child-Car accident region |

In the second example, when the server 10 acquires object information including senior as the object class and mobility impairment and dementia information as other object information in the step S100, and the search candidate region of FIG. 3A is set, the server 10 may acquire region information and correlation information as below.

TABLE 2

| Object information of target object | | Region information of search candidate region | | |
|---|---|---|---|---|
| Object class | Other object information | Situation information | Place information | Correlation |
| Senior | Mobility impairment, Dementia | Road (Rv3) Less busy region | Playground near four-way intersection (B) Bus stop near road (R$_{H2}$) | Senior-Bus stop Dementia-Bus stop Dementia-Less busy region Dementia-Near missing place |

Considering the event occurrence time, the situation of the region and the correlation between the place in the corresponding region and the target object, acquired through this process, the server 10 may determine the search region. The search region determination unit 17 determines the search region from the search candidate region.

In an embodiment, the search region determination unit 17 may determine the search region for searching for a CCTV video of the target object using the set of features of the target object and the region information of the search candidate region.

The set of features of the target object may be defined as below.

$$x = \langle x_{image}, x_{info}, x_{region} \rangle \quad \text{[Equation 1]}$$

x denotes the set of features of the target object, $x_{image}$ denotes the set of image features as the feature vector extracted from the image, $x_{info}$ denotes the set of non-image features included in the object information of the target object, and $x_{region}$ denotes the region information of the search candidate region.

As described above, the object information of the target object may be determined by the user input. Additionally, the region information of the search candidate region may be pre-stored, or at least part of region related information collected in real time may be used. Here, the information collected in real time may include information related to the amount of movement of object(s), and an incident and an accident in the corresponding region as described above. The correlation between the target object and the region information of the search candidate region may be pre-registered, or determined by learning.

When a plurality of search candidate regions is set, some or all of the search candidate regions may be determined as the search region. Additionally, when a single search candidate region is set, the set search candidate region is not determined as the search region, and a process of setting other search candidate region again may be performed.

In an embodiment, to determine the search region, the search region determination unit 17 may calculate a matching score based on the set of features of the target object and the set of features of the captured object seen in the image (for example, a video frame). The matching score indicates similarity between the target object and the captured object. The captured object having the feature vector that is equal or similar to the feature vector of the target object will be the target object with a high probability.

The feature value used to calculate the matching score in the feature value of the set of features of the image relies on the set of features of the target object.

In an embodiment, before calculating the matching score, the server 10 may acquire the set of features of the image including the subset of image features extracted from the image. For example, when the set of features of the target object includes the subset of image features extracted from the target object patch, the server 10 may pre-acquire the set of features of the image including the subset of image features extracted from the image.

The matching score may be calculated through various types of algorithms for calculating similarity between vectors. The similarity calculation algorithm may include at least one of Euclidian distance, Cosine distance, Mahalanobis distance or joint Bayesian.

For example, when the search region determination unit 17 is configured to calculate the matching score through the Cosine distance algorithm, the matching score may be calculated through the following Equation.

$$s(x_t, x_j) = \frac{x_t \cdot x_j}{\|x_t\| \|x_j\|} \quad \text{[Equation 2]}$$

Here, $x_t$ denotes the set of features of the target object, and $x_j$ denotes the set of features of the $j^{th}$ image captured in the search candidate region. The set of features of the image includes the set of features of the captured object included in the corresponding image. The set of features of the target object may include at least one of the set of non-image features of the target object or the set of image features of the target object as a subset.

The feature value used to calculate the matching score in the feature value of the set of features of the image relies on the set of features of the target object. The server 10 calculates the matching score using the set of features of the image corresponding to the subset included in the set of features of the target object.

In specific embodiments, when the set of features of the target object includes the subset of image features and the subset of non-image features extracted from the target object patch, the matching score may be calculated through the following Equation.

$$s(x_t, x_j) = \frac{x_t \cdot x_j}{\|x_t\| \|x_j\|} * (x_{info}, x_{region}) \quad \text{[Equation 3]}$$

The final distance is calculated by applying, to Equation 2, the set of features of the target object including the feature vector, the object information ($x_{info}$) and the region information ($x_{region}$) of the image and the set of features of the image of the corresponding region. For information associated with the object and the region having correlation defined therebetween, a predetermined value increases as the correlation value, and for each information (i.e., object information and region information), a different predetermined value increases. On the contrary, when there is no correlation between the object and the region (or decorrelated), the corresponding values may be subtracted. In some embodiments, the different predetermined value may be smaller than the correlation value.

Then, the matching score of the target object of the corresponding search candidate region is calculated.

For example, the object information ($x_{info}$) of the target object and the region information ($x_{region}$) are set to the initial value of 1, and for information having correlation defined therebetween, the correlation value additionally increases +1, and for each information (i.e., object information and region information), +0.1 increases.

Additionally, when the correlation is weak, or the correlation is detected in the pairs of default values, learning is automatically performed in the system, the corresponding correlation value increases +1, and each information increases by +0.1.

On the contrary, when the correlation is not detected for a predetermined time or decorrelated by the user's request, the value of each information decreases −0.1. Each correlation may be defined by the system user and learning.

In the above example, the initial value of 1, the correlation value of ±1 and the value of each information of ±0.1 are provided by way of illustration, and a variety of values such as values of 0.8 to 1.2 and values of 0.05 to 0.15 may be used.

Additionally, to determine the search region, the search region determination unit 17 may calculate the search probability based on the region information of the search candidate region, the set of features of the target object and the set of features of the captured object seen in the image. Here, the search probability refers to a probability used to determine whether it is possible or impossible to search for the video of the target object in the video of the search candidate region. For example, the search probability may be used as the criterion for classifying into a class in which it is possible to search for the video of the target object in the video of the search candidate region or a class in which it is impossible to search for the video of the target object.

In an embodiment, the server 10 calculates the search probability through a combination of an activation function and the matching score. The activation function may include Sigmoid function and Softmax function which are the logistic function, or their derivatives.

For example, the server 10 may calculate the search probability through the following Equation of a combination of the derivative of logistic function and the matching score.

$$f(x; \lambda, \gamma) = \frac{1}{1 + \lambda e^{-\gamma x}} \quad \text{[Equation 4]}$$

In Equation 4, x denotes the matching score calculated through the above Equation 2 or 3. $\lambda$ and $\gamma$ are constants, and $\lambda$ denotes a smoothing factor and $\gamma$ denotes a shrinking factor. The smoothing factor is a factor that smoothens the image of the search candidate region. The shrinking factor is a factor that shrinks the contrast of the image of the search candidate region. The smoothing factor may be, for example, a value in the range of 0.1 to 3 or a value in the range of 0.4 to 2.8. The shrinking factor may be a value in the range of 0.1 to 10 or a value in the range of 1 to 7.

The search region determination unit 17 determines the search region based on the search probability. In specific embodiments, the search region determination unit 17 determines the search candidate region(s) having the search probability that is equal to or higher than the threshold probability as the search region.

In an embodiment, the search region determination unit 17 may allocate the priority rank to the search candidate region based on the search probability, and determine at least one search candidate region as the search region. Additionally, the system user may randomly determine the search candidate region from the search candidate region results.

The search unit 19 may search for the video of the target object in the source video of the search region. Additionally, the search unit 19 may provide the user with the found video as the search results.

The server 10 determines the search region from at least one search candidate region based on at least one of the matching score or the search probability. As such, when the search region is determined and initial target object search is performed on the video of the corresponding region, it is possible to improve the search performance and speed.

It will be obvious to those skilled in the art that the search system 1 may include other components not described herein. For example, the search system 1 may further include a data input device, an output device such as a display and/or a printer, a storage device such as memory, a network, a network interface and a protocol.

A method for determining a search region according to another aspect of the present disclosure is performed by a computing device including a processor. Here, the computing device may include a computer and a server. Hereinafter, for clarity of description, the method for determining a search region will be described in further detail based on the embodiments performed by the search system 1 of FIG. 1.

FIG. 5 is a flowchart of the method for determining a search region according to an embodiment of the present disclosure.

Referring to FIG. 5, the method for determining a search region includes receiving an image query requesting an image of a target object (S510). The image query may include object information of the target object and/or a target object patch.

The server 10 may determine a search region using any one of a subset of non-image features acquired from the object information of the target object, a subset of image features extracted from the target object patch and a combination thereof.

The method for determining a search region includes generating a set of non-image features based on the object information of the target object of the image query (S511).

In an embodiment, the object information may include an object item including at least one of an object class item, a color item, an object size item, a texture item, an appearance feature item or an event item, and its data.

The set of non-image features may use a value of the object information as a feature value of some object items. Some object items may include, for example, size and/or texture.

The feature value of some other object items of the set of non-image features may be a value to which the item data of the object information is converted. The some other object items may include, for example, color, mental retardation and/or dementia.

The feature value of some other object items of the set of non-image features may be an image level of features extracted using a text represented by the item data as a text query. The some other object items may include, for example, accessories if worn.

Additionally, the method for determining a search region may include generating a set of image features based on the target object patch of the image query, when the target object patch is acquired (S512).

The set of image features may be acquired through various types of image attribute extraction algorithms. The image attribute extraction algorithm may include a machine learning model that extracts visual features from the input image. The image attribute extraction algorithm may include, for example, an attention model or a skeleton/body feature extraction model.

Through the steps S511, S512, the set of non-image features and/or the set of image features of the target object may be acquired as a subset of features of the target object.

The method for determining a search region includes setting a search candidate region according to a user input (S513).

In an embodiment, the user input may include an input for forming a shape having an area, an input for forming a line, and/or an input for forming a single point or a plurality of points. The user input may be implemented as a drag input or a pointing input.

The step S513 may determine a region corresponding to the corresponding shape, a region including a path corresponding to the line and a region based on the location of the point as the search candidate region.

The method for determining a search region includes determining a correlation between the search candidate region and the target object (S515). In an embodiment, the correlation is information defining association between the target object and the corresponding region. The correlation is determined based on association between a specific object and a specific place.

In the step S515, the correlation may be determined using the search candidate region of the step S513 and the object information of the step S510.

The method for determining a search region includes calculating a search probability for determining the search region (S517). In the step S517, the search probability may be calculated based on the region information of the search candidate region, the set of features of the target object and a set of features of a captured object seen in the image.

In an embodiment, the step S517 includes: calculating a matching score; and calculating a search probability through a combination of an activation function and the matching score.

In some embodiments, the matching score may be calculated through the above Equation 1. Additionally, the search probability may be calculated through the above Equation 2.

The search region is determined based on the search probability (S517).

A plurality of search regions may be determined in the step S517. In an embodiment, the plurality of search regions may be each allocated with priority ranks. The priority rank is based on the search probability. For example, the higher search probability, the higher priority rank.

The method for determining a search region includes searching for the target image of the target object in the image of the search region (S519). When the target image is found, the found image is provided to the user.

In embodiments in which a plurality of search regions is determined, when it fails to search for the target image in any one search region, searching for the target image may be performed in the search region having the next rank. In some embodiments, a start input for searching for the target image in the search region having the next rank may be further inputted.

In embodiments in which a single search region is determined, when it fails to search for the target image in the search region, an operation of determining another region as the search region may be performed. For example, after setting another region as the search candidate region in the step S513, the steps S515 to S517 may be performed.

The operation by the method using object information and region information according to the embodiment as described hereinabove and the system for performing the same may be, at least in part, implemented in a computer program and recorded in a computer-readable recording medium. For example, it may be implemented with a program product on the computer-readable medium including program code, and may be executed by the processor for performing any or all of the above-described steps, operations or processes.

The computer may be a computing device such as a desktop computer, a laptop computer, a notebook computer, a smart phone or like, and may be any integrated device. The computer is a device having at least one alternative and specialized processor, memory, storage, and networking component (either wireless or wired). The computer may run an operating system (OS) such as, for example, OS that is compatible with Microsoft Windows, Apple OS X or iOS, Linux distribution, or Google Android OS.

The computer-readable recording medium includes all types of record retrieval devices in which computer-readable data is stored. Examples of the computer-readable recording medium include read only memory (ROM), random access memory (RAM), compact disc read only memory (CD-ROM), magnetic tape, floppy disk, and optical data storage and retrieval devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

The invention claimed is:

1. A method for determining a search region, performed by a computing device including a processor, the method comprising:
   acquiring object information of a target object included in an image query;
   generating a set of non-image features of the target object based on the object information;
   setting a search candidate region based on a user input;
   acquiring information associated with the search candidate region from a region database;
   determining a search region based on the information associated with the search candidate region and at least part of the set of non-image features;
   acquiring a target object patch representing at least part of a target patch, included in the image query; and
   generating a set of image features of the target object based on the target object patch,
   wherein the search region is determined further based on the set of image features of the target object,
   wherein the set of image features is generated by applying the target object patch to a machine learning model configured to detect a body part in a human image seen in a target patch or a patch of an object of interest and calculate skeleton information and body-part information, extract global features from reconstruction information of the skeleton and the body-part in combination, and extract features per part from each of the skeleton information and the body-part information, and output the feature result information of a tube by concatenation of the global features and the features per part.

2. The method for determining a search region according to claim 1, wherein setting the search candidate region comprises:
   when the user input forms a shape having an area, setting a region corresponding to the formed shape as the search candidate region;
   when the user input forms a line, setting a region including the formed line as a path as the search candidate region;
   when the user input forms a point, setting at least one search candidate region based on the point; and
   when the user input forms a plurality of points, generating at least one path based on the plurality of points, and setting a region including the generated path as the setting candidate region.

3. The method for determining a search region according to claim 1, wherein the information associated with the search candidate region includes geographic information of a corresponding preset region, information associated with a place located in the corresponding preset region, and situation information representing a normal situation of all or part of the corresponding preset region, and
   the situation information includes a time, frequency or location of an event occurred before the image query is inputted, and an amount or direction of movement of an object in the corresponding preset region.

4. The method for determining a search region according to claim 1, further comprising:
   determining a correlation between the search candidate region and the target object based on a correlation rule defining association between a specific region and a specific object.

5. The method for determining a search region according to claim 1, wherein the object information includes a plurality of feature items and data of the corresponding items, and
   the plurality of feature items includes at least one event information related to the target object among an object class, a color item, an object size item, texture information and appearance information.

6. A non-transitory computer-readable recording medium having stored thereon a program which when executed by a computer processor performs the method for determining a search region according to claim 1.

7. A system comprising a plurality of closed-circuit televisions (CCTVs) and a server, wherein the server comprises:
a feature acquisition unit to acquire object information of a target object included in an image query, and generate a set of non-image features of the target object based on the object information;
a search candidate setting unit to set a search candidate region based on a user input;
a search region determination unit to acquire information associated with the search candidate region from a region database, and determine a search region based on the information associated with the search candidate region and at least part of the set of non-image features; and
a search unit to search for a video of the target object in a source video captured by the CCTV in the determined search region;
wherein the search region determination unit further to acquire a target object patch representing at least part of a target patch, included in the image query, and generate a set of image features of the target object based on the target object patch,
wherein the search region is determined further based on the set of image features of the target object,
wherein the set of image features is generated, based on at least the search region determination unit, by applying the target object patch to a machine learning model configured to detect a body part in a human image seen in a target patch or a patch of an object of interest and calculate skeleton information and body-part information, extract global features from reconstruction information of the skeleton and the body-part in combination, and extract features per part from each of the skeleton information and the body-part information, and output the feature result information of a tube by concatenation of the global features and the features per part.

* * * * *